United States Patent

[11] 3,602,154

[72] Inventors Erwin H. Schimkat
Garden City Park;
John Nardozza, Bayside; Joel Tropp, Valley Stream, all of, N.Y.
[21] Appl. No. 824,980
[22] Filed May 15, 1969
[45] Patented Aug. 31, 1971
[73] Assignee Autoprod, Inc.
Brooklyn, N.Y.

[54] FOOD DISPENSING APPARATUS
13 Claims, 10 Drawing Figs.

[52] U.S. Cl. .................................................. 107/1 R
[51] Int. Cl. .................................................. A23g 3/00
[50] Field of Search .................................................. 107/1, 27

[56] References Cited
UNITED STATES PATENTS

| | | | |
|---|---|---|---|
| 3,358,618 | 12/1967 | Vetta | 107/1 |
| 3,368,501 | 2/1968 | Kuhlman | 107/1 |
| 3,433,181 | 3/1969 | Steins | 107/1 |
| 3,450,067 | 6/1969 | Kao | 107/1 |

Primary Examiner—Louis K. Rimrodt
Attorney—Irving Seidman

ABSTRACT: A food dispensing device for depositing food products upon a base is provided with a conveyor for automatically moving the base to a sauce dispenser, in timed sequence, for receiving an even deposit of a measured amount of sauce thereupon and then to a cheese dispenser where a measured amount of cheese is evenly deposited upon the base. Provision is made for shredding or grating a supply of a solid food ingredient to be applied to the base, and for applying varying amounts of a food product upon the base of varying sizes.

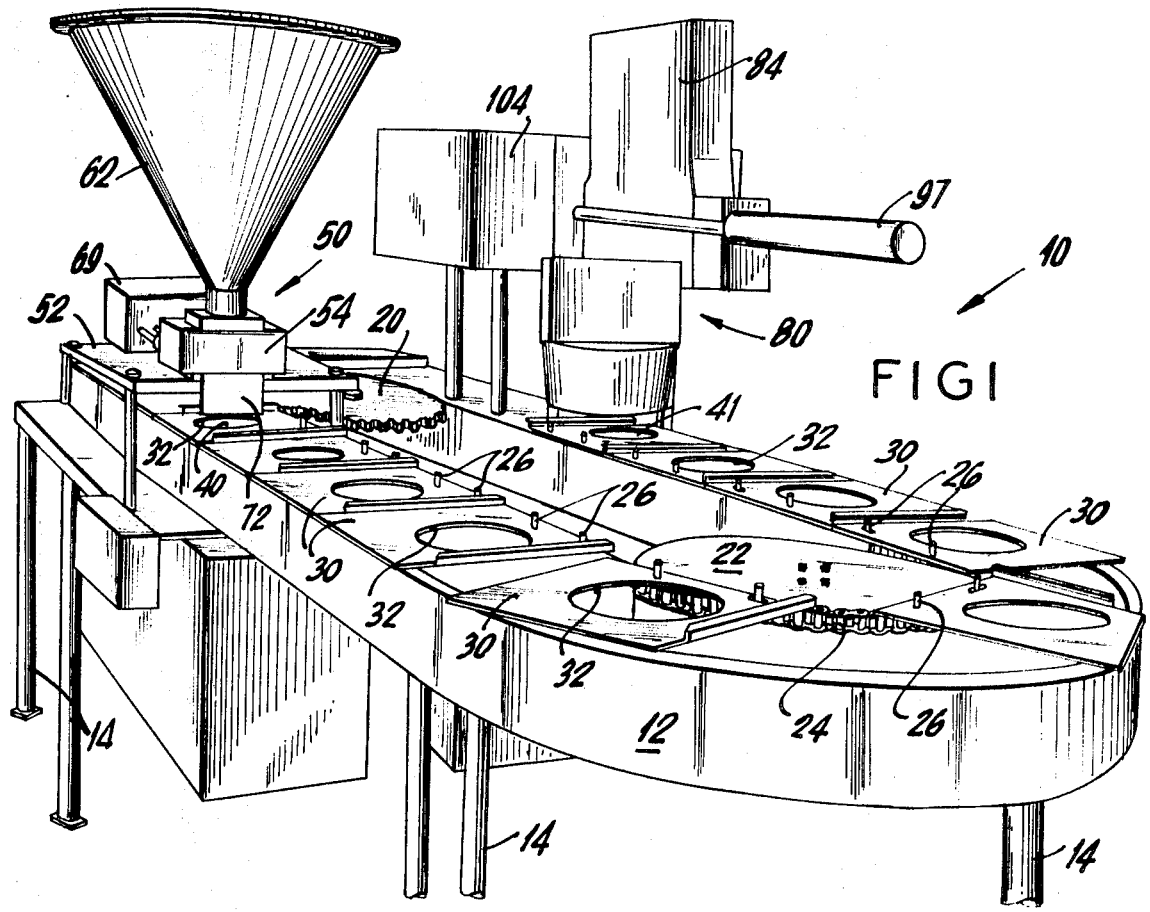
FIG 1
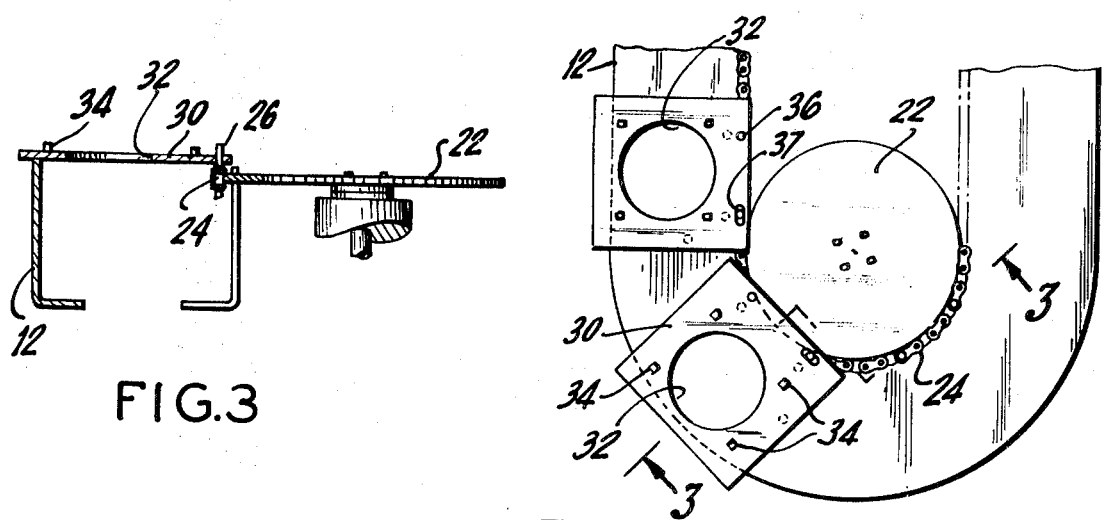
FIG.3
FIG.2
INVENTORS
ERWIN H. SCHIMKAT
JOHN NARDOZZA
BY JOEL TROPP
Irving Seidman
ATTORNEY

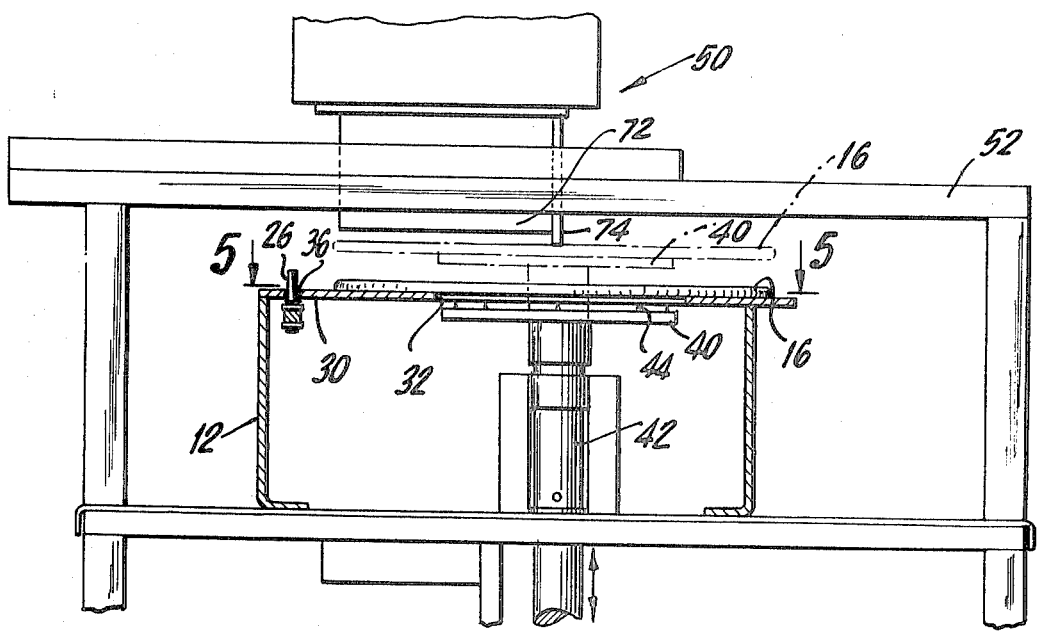
FIG.4
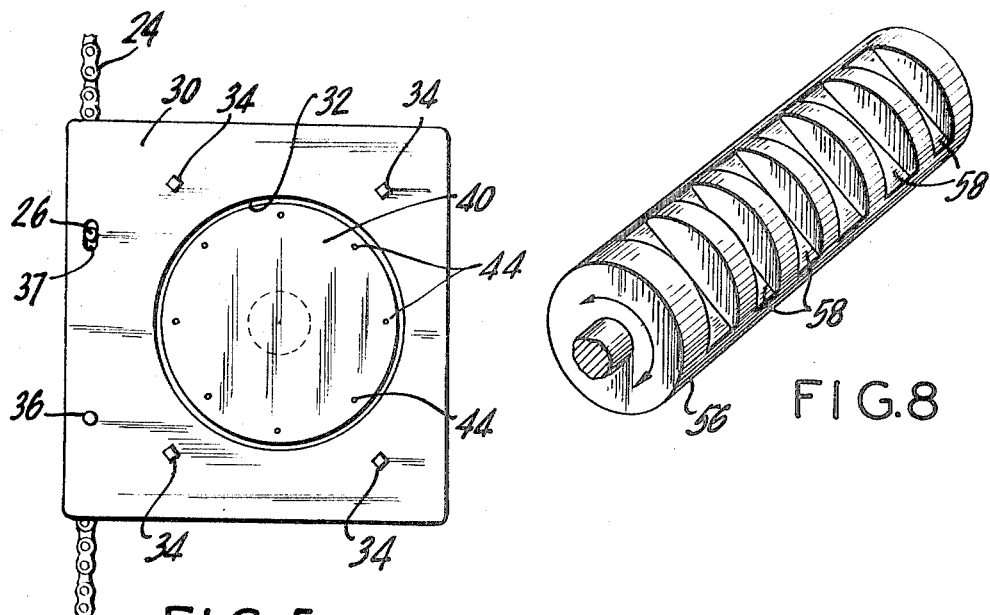
FIG.5
FIG.8
INVENTORS
ERWIN H. SCHIMKAT
JOHN NARDOZZA
BY JOEL TROPP
Irving Seidman
ATTORNEY

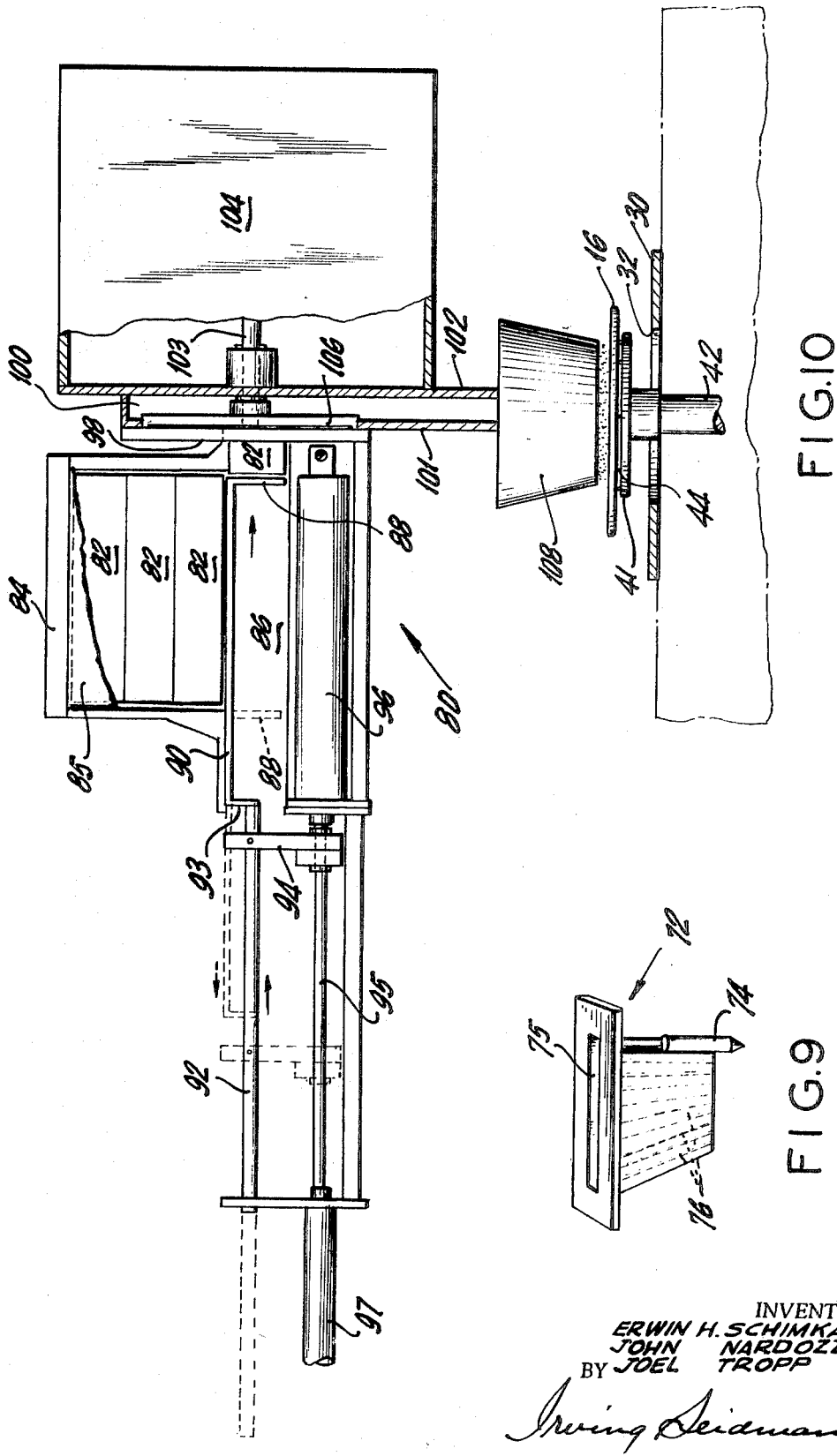

FOOD DISPENSING APPARATUS

FOOD DISPENSING APPARATUS

The present invention relates to a food dispensing apparatus and more particularly to a device which will uniformly dispense a measured amount of edible ingredients upon a base such as a pizza pie, a pie shell or the like.

The pizza pie, or pizza as it is more commonly referred to, has been popular gastronomic specialty in restaurants and other eating establishments. In the preparation of the pizza, a variety of food ingredients, singly or in combination to meet the taste of the consumer, are deposited or layered upon a flat bottom dough crust before baking. Such food ingredients usually include tomato sauce with or without solid particles suspended therein, grated or shredded cheese, mushrooms, sausage slices, anchovies and the like. It will be evident to one versed in the art that since such food ingredients are generally applied manually, the amount and uniformity of the ingredients upon a pie crust will vary from cook to cook and from pie to pie.

Additionally, because of the popularity of the pizza, it has become a frozen food staple, requiring that mass production means be substituted for manual preparation of the pizza in order to meet the volume demanded by the consuming public.

It is therefore an object of the present invention to provide an apparatus for uniformly distributing a measured amount of one or more food ingredients upon a base.

Another object of this invention is the provision of a device adapted to measure and uniformly position at least one food ingredient upon a pie shell within a predetermined area.

A further object of this invention is to provide a device for automatically distributing a measured amount of one or more food ingredients upon a pie shell which is adjustable to conform to the varying sizes of pie shells being made in the frozen food industry.

Yet another object of the present invention is the provision of a food dispenser which can grate or shred a quantity of cheese for spreading upon a pie shell.

Still another object of the present invention is the provision of a food dispensing apparatus for uniformly spreading a metered amount of one or more food ingredients upon a pie shell in a minimum amount of time and which can be easily assembled and disassembled for complete cleaning.

Another object of this invention is the provision of a food dispensing device which will uniformly spread a metered amount of one or more food ingredients upon a pie shell quickly and expeditiously in order to greatly accelerate the manufacture of pizza pies and the like.

A further object herein is the provision of a food dispenser adapted to move a base in timed sequence along a course for depositing and layering one or more food ingredients thereupon.

The foregoing objects, advantages and inventive features of the present invention are attained by the provision of a conveyor for moving a pie beneath a first food dispensing unit at which point the pie is automatically lifted and rotated on the axis of a common circle while a measured amount of sauce is deposited thereupon. Provision is further made to move the pie along the conveyor to a second dispensing unit, in timed sequence, where means are provided for shredding or grating a supply of cheese and layering a measured amount thereof uniformly upon the pie.

Other aims, objects, advantages and inventive features of the present invention will be apparent to those versed in the art when considered in view of the drawings and specifications wherein like numbers identify like parts in the several views and wherein:

FIG. 1 is a view in perspective of the food dispensing apparatus in accordance with the present invention illustrating the principle parts thereof;

FIG. 2 is a top plan view, partially broken away, of the conveyor showing the pie trays being carried therealong;

FIG. 3 is a view taken on line 3—3 of FIG. 2;

FIG. 4 is a side sectional view of the turntable mechanism for lifting and revolving a pizza pie below a food dispensing unit;

FIG. 5 is a view taken on line 5—5 of FIG. 4;

FIG. 8 is a perspective view of the valve shown in FIG. 7;

FIG. 9 is a view of the nozzle used for spreading the sauce or other tacky food ingredient, and FIG. 10 is a view of the cheese cutting mechanism and the spreader.

Figure 6:
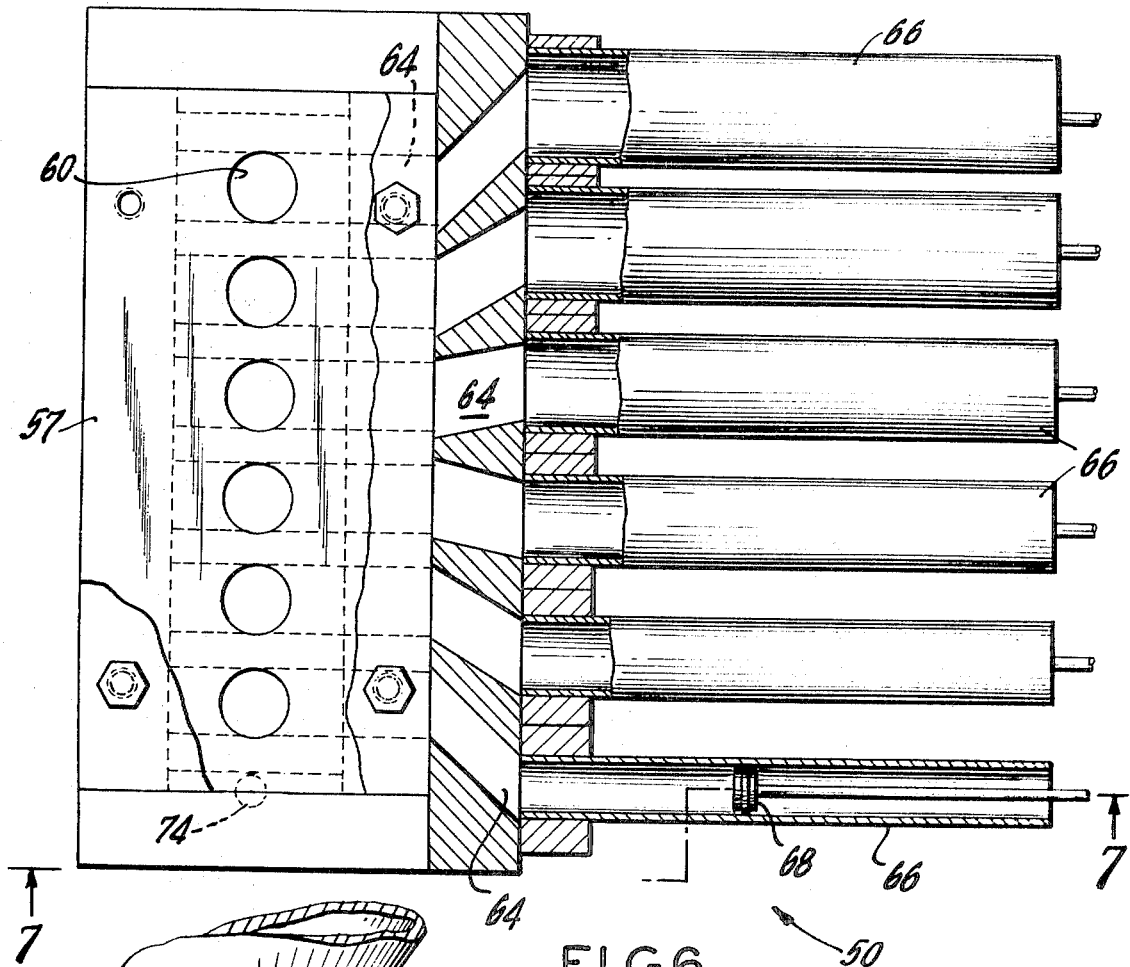
FIG. 6 is a view, partially in section, illustrating details of the sauce dispenser.

Referring now to the drawings, the food dispensing apparatus 10 for spreading edible products upon a pizza pie, a pie shell or the like, comprises an elongated, substantially oval frame structure 12 supported by a plurality of vertical legs, 14. Disposed horizontally within said frame 12, there is provided a pair of sprockets 20, 22, engaging a link chain 24. Said sprockets are alternately provided with conventional power means (not shown) providing one sprocket with a constant move drive and the second sprocket with an indexing drive so that link chain 24 may be driven in a forward or reverse direction, or may be indexed to stop and start as desired and as will be more fully described hereafter. A plurality of vertically projecting pins 26 are intermittently disposed between the linkage forming the chain 24, said pins 26 adapted to engage a plurality of pie trays 30. The link chain, being disposed around sprocket 20 at one end of frame 12 and around sprocket 22 at the other end of the frame, forms an endless rotatable drive along the length of the frame as illustrated in FIG. 1.

Trays 30, adapted to carry a pizza pie 16, fruit pie shell and like food products, are fabricated of aluminum or other suitable material which may be easily cleaned. Such trays are generally square, but may assume any suitable configuration and size to accommodate a pie crust or like food product upon its surface, and is provided with a central aperture 32 which is smaller in diameter than the pie disposed thereupon, yet which is sufficiently large enough to permit a turntable 40, presently to be described, to pass therethrough. A plurality of positioning studs 34 are disposed along the perimeter of aperture 32 for centrally positioning a pie crust over said aperture. A pair of slots 36, 37, at least one of which is elongated, is provided in trays 30 for engagement with pins 26. It will be seen that when the slots are engaged by pins 26, the link chain will carry the trays along the designated course and will permit such trays to be carried around a curved course as it traverses the arc effected by the sprockets. It will be noted that with the change of size of a pie, trays 30 can be easily and quickly disengaged from pins 26 and a tray of suitable size for the pie to be carried can be placed upon the conveyor. It is additionally to be noted that studs 34 may be magnetic blocks so that pie crusts in metallic pie plates can be effectively positioned and retained in position upon trays 30 during movement thereof along the conveyor.

Located above and aligned with the conveyor, there is provided a sauce dispenser unit 50 and a cheese dispenser unit 80, presently to be described. A first turntable 40 is located immediately below said sauce dispenser unit 50 and a second turntable 41 is located below the cheese dispenser unit 80. Said turntables 40, 41, generally assume a circular configuration and are of a diameter less than the diameter of aperture 32 of trays 30, so as to permit such turntables to pass through said apertures. The turntables are mounted upon a rotatable shaft 42 powered by conventional means and are indexed to vertically lift the turntables through apertures 32 as trays 30 are brought to a stop directly over each of said turntables. Turntables 41 and 42 are further provided with a plurality of pins 44 upon its upper surface, adapted to engage a pie crust deposited thereupon and to prevent it from sliding or otherwise slipping or spinning from the turntables as they are rotated. Where, of course, metallic pie plates are used, magnetic or suction means may be employed upon the surface of the turntables and are substituted for said pins 44 to engage and retain the metallic plates in position upon the turntables.

Positioned above turntable 40, the sauce dispensing unit 50 is mounted upon a frame 52. The sauce dispensing unit 50 comprises a valve 54 provided with a cylindrical member 56 disposed within a block 57 and axially rotatable therein. Member 56 is provided with a plurality of slotted chambers 58, each of said chambers being generally of the same size, although not necessarily so. A plurality of inlet ports 60 are provided at the top of block 57, and a tapered food reservoir 62 is mounted thereupon. Along one side of block 57, there is provided a plurality of ports 64 corresponding to slotted chambers 58, each having a cylinder 66 secured thereto by plate 67. Pistons 68, disposed within each of said cylinders, are powered by a common air power source 69. Block 57 is further provided with a plurality of outlet ports 70 at the bottom thereof and aligned with slotted chambers 58 of member 56. A spreading nozzle 72 is generally of a rectangular configuration and is provided with an elongated entry slot 75, said slot secured to block 57 at outlet ports 70. The body of nozzle 72 may be truncated or may be of a configuration assuming a triangle as shown in FIG. 9. A plurality of channels 76 or tubular members are disposed within said nozzle so as to receive a supply of sauce therethrough and direct the flow of sauce emitted from block 57 as will be presently described. At one end of nozzle 72, a spring loaded pin 74 is provided adapted to be embedded in a pie crust and effecting anchorage of the pie in position.

Figure 7:
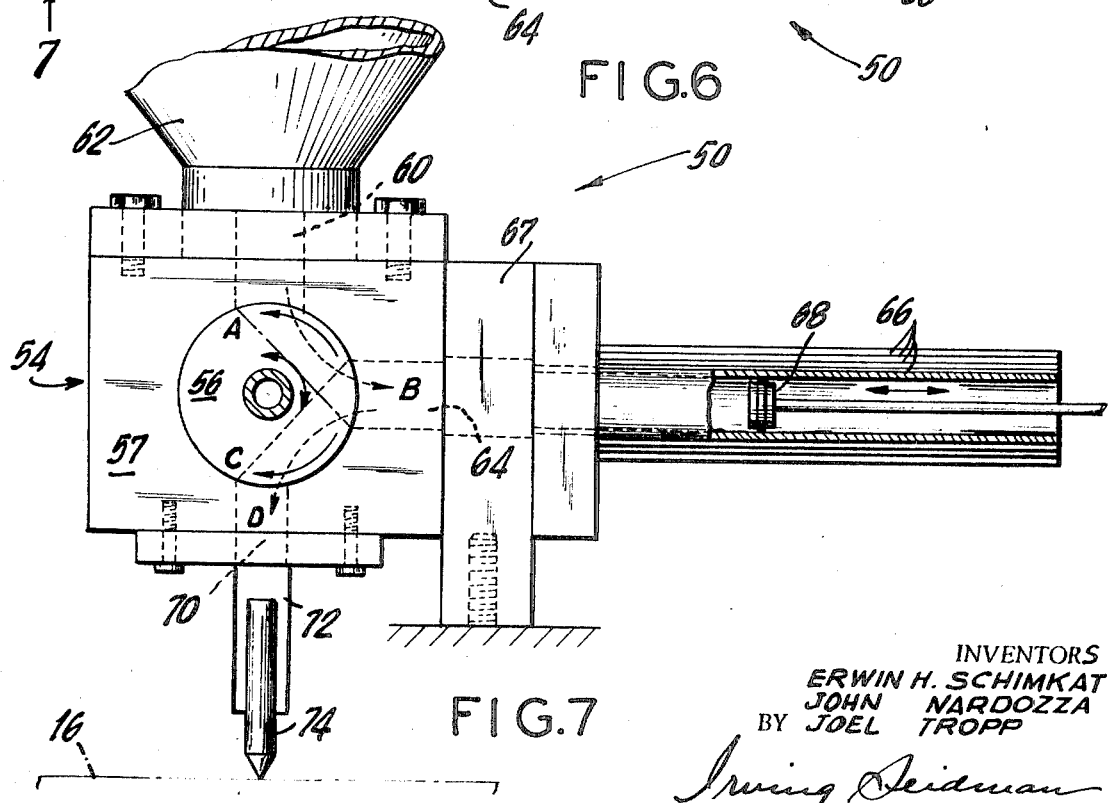
FIG. 7 is a view taken on line 7—7 of FIG. 6.

In the operation of the sauce dispenser, a supply of sauce, lumped meats, tomato peels, rinds, or like food ingredients are fed into reservoir 62. As a pie 16 is conveyed above turntable 40, it is lifted from tray 30 by said turntable as it passes through aperture 32, and pin 74 is embedded in the center of the pie as illustrated in FIG. 7. At this point, piston 68 is in an open position and cylinder 56 is in position "A" allowing the flow of the food ingredient in the direction of the dotted arrows at "B." As piston 68 is powered forward, cylinder 56 is rotated in the direction of the arrows to "C" and the food ingredients flow in the direction of the dotted arrows at "D" to outlet port 70.

It is to be noted that each of the cylinders 66 are of varying sizes, being smaller at the end where pin 74 is located and becoming progressively larger at the opposite end thereof to enable a greater quantity of food to be emitted at that end. Since pin 74 is designed to be embedded in the center of the pie, as the pie is rotated around its axis, it will be evident that a greater quantity of food ingredients are necessarily required along the outer perimeter of the pie. Since cylinders 66 are of varying sizes, the larger of them being in the area where a greater amount of food ingredients are needed on the pie, these cylinders are adapted to effect the greater amount through the nozzle 72. It is further to be noted that nozzle 72, provided with a plurality of channels 76 deposit an even distribution of the food upon the pie. Where tubular members (not shown) are substituted in the nozzle for the channels, such tubular members may be angled in any directional pattern to deposit a quantity of food upon the pie as desired. Additionally, the channels of the nozzle may be selectively sealed as for example by plugging, to permit a deposit of food around any area of the pie in a greater or lesser amount. For example, where it is desired to deposit a "ribbon" of a food ingredient as may be the case in decorating a cake, one, or several channels of the nozzle may be sealed. The amount and placement of the food ingredients can thus be regulated by the size and amount of cylinders 66, outlet ports and nozzles used.

Turning now to the cheese dispensing unit 80, a supply of cheese 82 is block form is stored in a magazine 84 or other suitable storage facility, said magazine being provided with a door 85 for easy loading thereof. Below magazine 84, a chamber 86 is provided for receiving a block of cheese therein for shredding, grating or the like. A cheese pusher 88, vertically disposed in said chamber, is provided with an upper horizontal arm 90 rearward thereof. A horizontal rod 92, secured to said upper arm 90 by a bracket 93 is attached by linkage 94 to a piston arm 95 of an air cylinder 96, the operation of said cylinder being controlled by conventional electrical switches 97 or like means, for controlling the air power supply thereto.

Chamber 86 is provided with an outlet 98 which enters a substantially vertical chamber 100, said chamber having a face plate 101 and back plate 102 through which a shaft 103 projects therethrough from compartment 104 housing the power and motive means designed to drive said shaft. At the forward end of said shaft 103, there is mounted a generally circular blade 106 for rotation within chamber 100. Said blade is adapted to be removed for easy cleaning and replacement of a blade which is designed for shredding, grating, slicing or the like, according to the size and style as desired by the user thereof.

As illustrated in FIG. 10, a block of cheese is deposited in chamber 86 and is pushed forward by pusher 88 into outlet 98 for contact with blade 106. As the cheese is shredded grated, sliced or otherwise cut as desired, and falls through chamber 100, it is directed upon a pie by means of hopper 108. After the pie has received a layer of sauce or the like, as has heretofore been described, turntable 40 is retracted and the pie 16 is again deposited upon tray 30 and is moved to the cheese dispensing unit 80, where turntable 41 automatically is activated and is vertically lifted through aperture 32, rotating the pie under hopper 108 to receive a supply of cheese thereupon.

In the operation of the cheese dispensing unit, it is to be noted, as illustrated in FIG. 10 that the upper arm 90 effectively maintains the block of cheese in magazine 84. As one block of cheese is completely consumed by the cutter 106, upper arm, and with it cheese pusher 88 is retracted to a backward position as indicated in the dotted lines, thus allowing a new block of cheese to enter chamber 86 so as to be pushed against blade 106 for cutting.

While the present invention herein described and disclosed constitutes a preferred embodiment of the invention, it is to be understood that various changes and modifications are contemplated as being within the spirit and scope of the invention as defined in the claims appended hereto.

1. A food dispensing apparatus for depositing sauce and cheese ingredients on a base comprising in combination,
   a frame member;
   a plurality of trays for carrying said base thereon, each of said trays having a central aperture therein;
   conveyor means supported on said frame member for moving said trays along a predetermined course;
   timed drive means for selectively actuating said conveyor means;
   means supported on said frame member for dispensing the sauce ingredient;
   means supported on said frame member for dispensing the cheese ingredient;
   means supported on said frame member for distributing the dispensed sauce ingredient on said base;
   means supported on said frame member for distributing the dispensed cheese ingredient on said base;
   each of said distributing means including a turntable disposed beneath each of said dispensing means;
   a vertically disposed shaft;
   said turntable secured to the top of said shaft;
   timed drive means associated with said shaft and the lower end thereof for first lifting, then rotating and finally retracting said shaft and the turntable carried therewith through the aperture of said trays when said trays are centered above said turntable; and
   means for securing said base against slippage on said turntable while said turntable is being rotated.

2. A food dispensing apparatus according to claim 1 including positioning means on said trays for placement of said base over the central aperture of each of said trays.

3. A food dispensing apparatus according to claim 2 wherein said base is edible and said positioning means is a plurality of studs disposed upon the upper surface of said trays around the perimeter of the central aperture thereof adapted to retain said edible base in position over said central aperture.

4. A food dispensing apparatus according to claim 3 wherein said means for securing said base on said turntable is a plurality of pins disposed upon the upper surface of said turntable.

5. A food dispensing apparatus according to claim 2 wherein said base is metallic and said positioning means is at least one magnetic stud disposed upon the upper surface of said trays around the outer perimeter of the central aperture thereof adapted to retain said metallic base in position over said central aperture.

6. A food dispensing apparatus according to claim 5 wherein said means for securing said metallic base upon said turntable is a plurality of metallic members disposed upon the upper surface of said turntable.

7. A food dispensing apparatus according to claim 1 wherein said conveyor means for moving said trays along a predetermined course comprises a pair of sprockets; and endless link chain engaging said sprockets, and means for removably engaging said trays to said link chain.

8. A food dispensing apparatus according to claim 7 wherein said means for removably engaging said trays to said link chain comprises a plurality of vertically projecting pins intermittently disposed along the links of said link chain; and said trays having t least one elongated slot along one edge thereof adapted to be engaged by one of said vertically projecting pins.

9. A food dispensing apparatus according to claim 1 wherein said sauce dispensing means comprise
   a substantially rectangular block having an axial bore therethrough;
   a cylindrical member disposed within said bore, said member being axially rotatable therein;
   a plurality of slotted chambers in said cylindrical member;
   at least one inlet port at the top of said block extending into said bore adapted to permit sauce to enter into the slotted chambers when the cylindrical member is rotated to permit said chambers to open into said inlet port;
   a hopper mounted upon said inlet port for directing a supply of sauce therein;
   at least one outlet port at the bottom of said block for discharging the sauce deposited in said chambers when the cylindrical member is rotated to align itself with said outlet port;
   said bore having at least one side port in alignment with said slotted chambers, and
   pump means in said side port for rotating said cylindrical member from and to said inlet port and said outlet port.

10. A food dispensing apparatus according to claim 9 including a substantially truncated rectangular nozzle having a slot along the top thereof; said nozzle secured to said block, the slot thereof being contiguous with the outlet port of said block; at least one inner wall in said nozzle defining a channel therein for directing a flow of sauce from said chambers to said base; a spring-loaded vertical pin secured to one end of said nozzle and projecting downwardly therefrom adapted to be embedded in the center of a base, said nozzle positioned above said base from the center thereof to its outer perimeter, and means for selectively sealing said channels in said nozzle.

11. A food dispensing apparatus according to claim 1 wherein said cheese dispensing means comprise
   a magazine for storing a supply of cheese blocks therein;
   a substantially rectangular horizontal chamber below and contiguous with said magazine, said horizontal chamber having an outlet at one end thereof;
   a vertical chamber connected to said horizontal chamber, the opening of said horizontal chamber at the side thereof forming a passageway therebetween;
   a horizontal shaft projecting into said vertical chamber;
   a circular blade mounted on the end of said shaft within said vertical chamber;
   motive means for driving said horizontal shaft;
   a vertical plate disposed within said horizontal chamber for urging a block of cheese forward;
   means for moving said vertical plate forward toward the circular blade and retracting said plate when said block of cheese is consumed by said blade;
   a hopper secured to the lower part of said vertical chamber for directing the cheese upon said base.

12. A sauce dispenser for depositing a sauce upon a base comprising:
   a substantially rectangular block having an axial bore therethrough;
   a cylindrical member disposed within said bore, said member being axially rotatable therein;
   a plurality of slotted chambers in said cylindrical member;
   at least one inlet port at the top of said block extending into said bore adapted to permit sauce to enter into the slotted chambers when the cylindrical member is rotated to permit said chambers to open into said inlet ports;
   a hopper mounted upon said inlet port for directing a supply of sauce therein;
   at least one outlet port at the bottom of said block for discharging the sauce deposited in said chambers when the cylindrical member is rotated to align itself with said outlet port;
   said bore having at least one side port in alignment with said slotted chambers;
   pump means in said side port for rotating said cylindrical member from and to said said inlet port and said outlet port;
   a turntable disposed beneath said outlet port;
   a vertically disposed shaft, said turntable being secured at the top of said shaft;
   timed drive means actuating said shaft adapted to lift, rotate and retract said turntable carrying said base thereupon.

13. A sauce dispenser according to claim 12 including a substantially truncated rectangular nozzle having a slot along the top thereof; said nozzle secured to said block, the slot thereof being contiguous with the outlet port of said block; at least one inner wall in said nozzle defining a channel therein for directing a flow of sauce from said chambers to said base; a spring loaded vertical pin secured to one end of said nozzle and projecting downwardly therefrom adapted to be embedded in the center of said base, said nozzle positioned above said base from the center thereof to its outer perimeter, and means for selectively sealing said channels in said nozzle.